U. WEDGE.
METALLURGICAL FURNACE.
APPLICATION FILED FEB. 28, 1914.
1,119,483.
Patented Dec. 1, 1914.
2 SHEETS—SHEET 1.
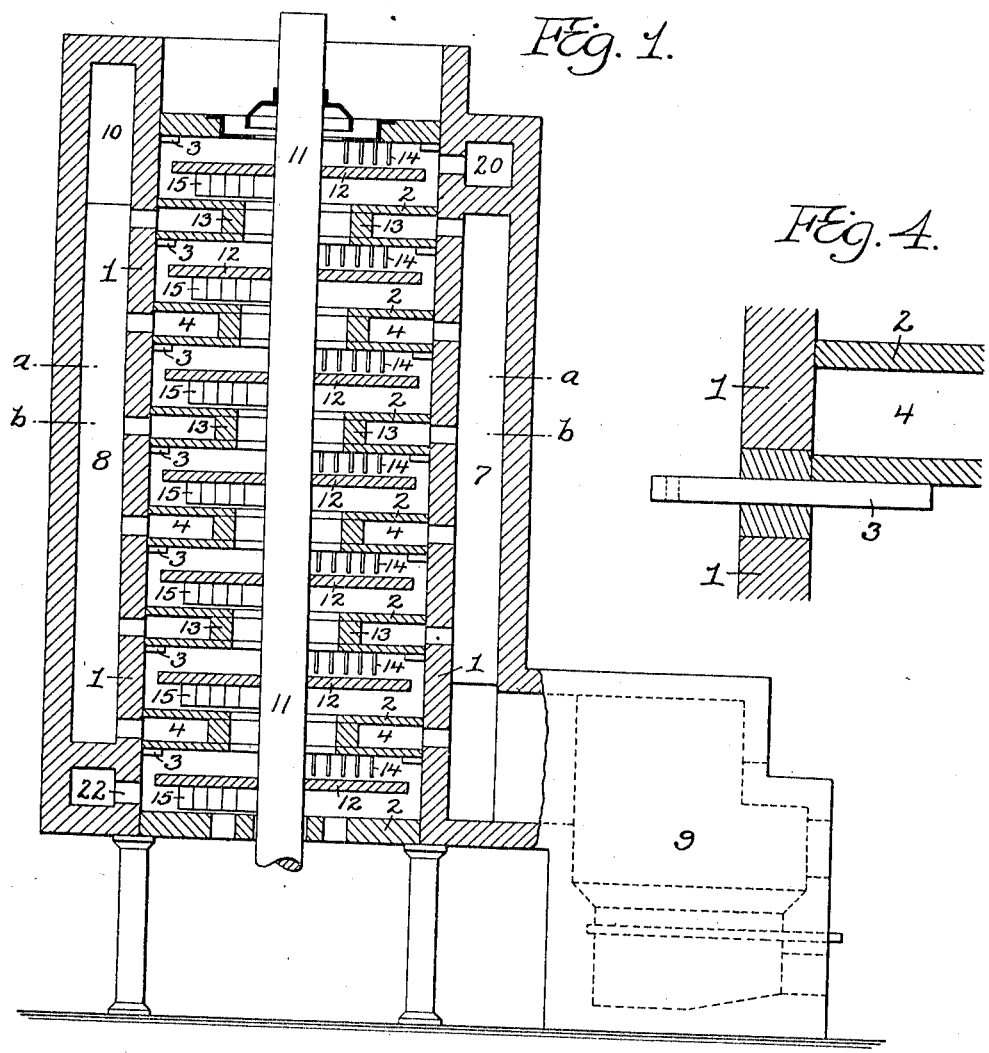
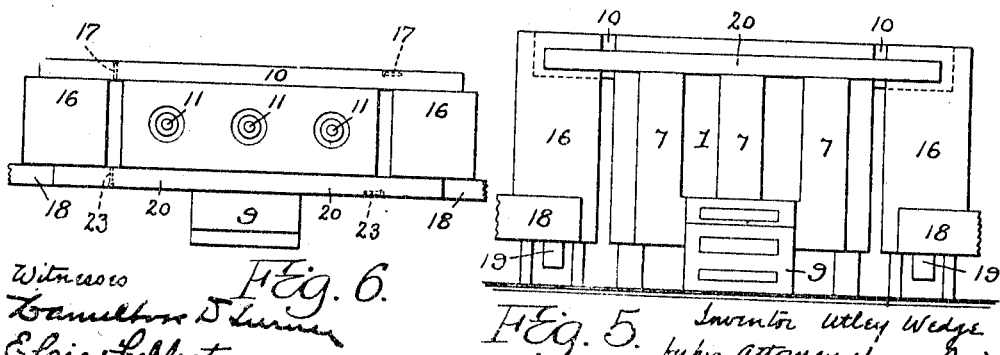

U. WEDGE.
METALLURGICAL FURNACE.
APPLICATION FILED FEB. 28, 1914.
1,119,483.
Patented Dec. 1, 1914.
2 SHEETS—SHEET 2.
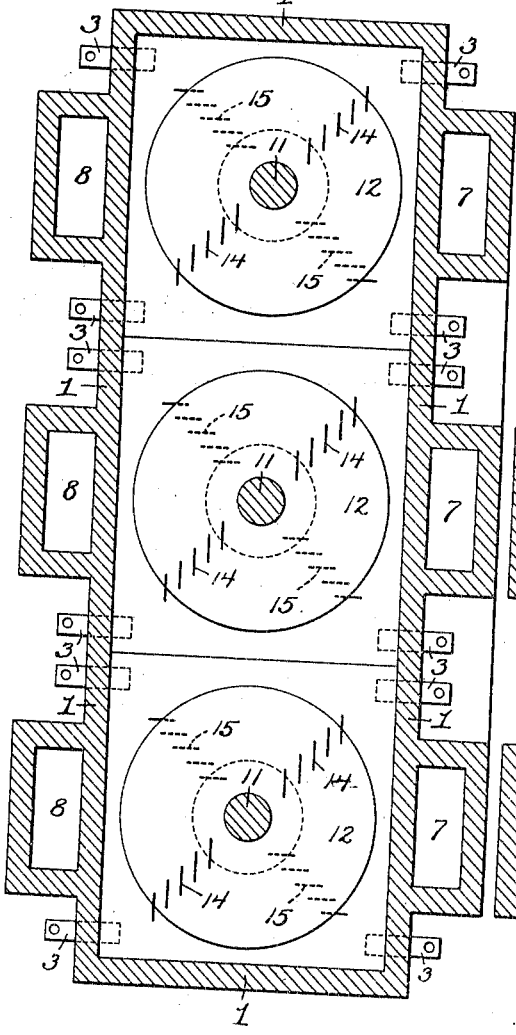
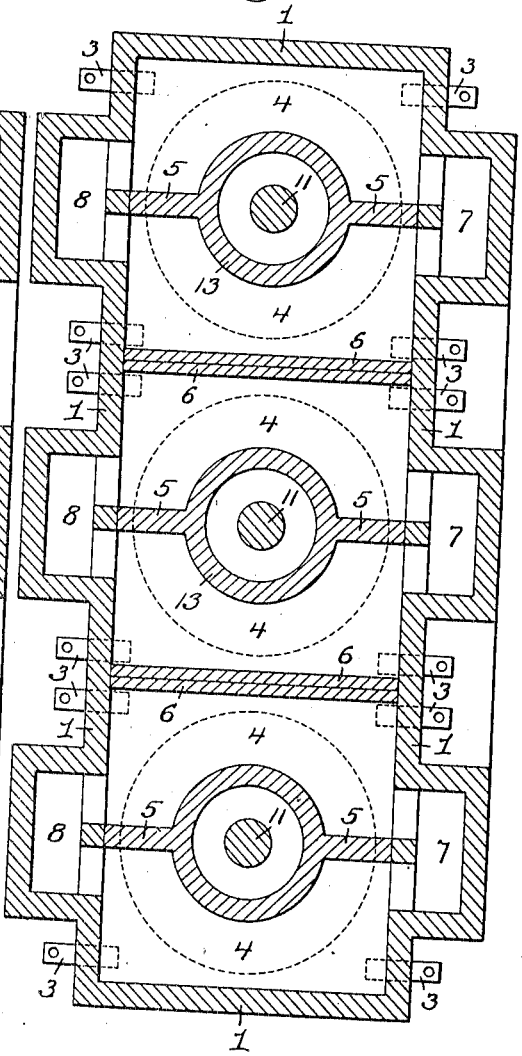

UNITED STATES PATENT OFFICE.

UTLEY WEDGE, OF ARDMORE, PENNSYLVANIA.

METALLURGICAL FURNACE.

1,119,483.  Specification of Letters Patent.  Patented Dec. 1, 1914.

Application filed February 28, 1914. Serial No. 821,676.

*To all whom it may concern:*

Be it known that I, UTLEY WEDGE, a citizen of the United States, residing in Ardmore, Pennsylvania, have invented certain Improvements in Metallurgical Furnaces, of which the following is a specification.

My invention relates to that type of superposed hearth furnace in which stationary hearths alternate with rotating hearths, one object of my invention being to provide for the effective heating of the stationary hearths in a furnace of the muffle type, another object being to provide for the ready assembling or dismantling of the hearths of the furnace, and another object being to provide an abundant supply of heated air for use in the treating chambers of the furnace. These objects I attain in the manner hereinafter set forth, reference being had to the accompanying drawings, in which—

Figure 1 is a view, partly in vertical section and partly in elevation, of a furnace constructed in accordance with my invention; Fig. 2 is a horizontal section on the line *a—a*, Fig. 1; Fig. 3 is a horizontal section on the line *b—b*, Fig. 1; Fig. 4 is an enlarged transverse sectional view of a portion of the furnace; Fig. 5 is a side elevation on a reduced scale of the furnace and certain regenerators employed in connection therewith, and Fig. 6 is a plan view of Fig. 5.

The main body or casing of the furnace is a rectangular structure 1, within which are a series of superposed fixed hearths 2, each extending from end to end and from side to side of the structure 1, each of these fixed hearths being supported in position by resting upon feet 3 fitted to lateral openings in the side walls of the furnace and movable laterally in said openings so that they can be projected in order to support the hearths or retracted so as to remove said support. The feet 2 are of such size and are composed of such material that they will not be destroyed by the heat to which they are subjected.

Each of the hearths is also, by preference, made in sections, of which there are three in each hearth in the present instance, each of these sections having extending transversely through it a chamber 4 separated into two non-communicating portions by a central partition 5, and each section is also provided with an end wall or walls 6 whereby it is cut off from communication with the adjoining section or sections.

At one side of the furnace, in line with each section of the fixed hearths, are vertical flues 7 and at the opposite side of the furnace, in line with the flues 7, are like vertical flues 8, these flues communicating with each other through the chambers of the hearth sections, as shown in Fig. 3. The flues 7 are inlet flues and communicate at the bottom with a fireplace 9 or other fuel burner which discharges products of combustion into the lower portion of each flue 7, the latter distributing these products of combustion to the chambers of the different hearths 2 and the flues 8 collecting the products of combustion after they have circulated through said hearths 2 and delivering them to a transverse flue 10 at the top of the furnace.

Each of the hearths 2 has therein a central opening through which passes a vertical shaft 11, the opening being of considerably greater diameter than the shaft so as to provide an annular passage around the latter, and said shaft having mounted upon it a series of rotating hearths 12, each of which occupies a position above a corresponding fixed hearth, rotative movement being imparted to the shaft 11 and its hearths 12 in any suitable manner.

The central partition 5 in the heating chamber of each section of the fixed hearths surrounds the opening in said section, as shown at 13 in Figs. 1 and 3, so that there is no communication between the heating chambers of the hearth and the treating chambers of the furnace.

The fixed hearths 2 have depending rabbles 14 and the rotating hearths 12 have depending rabbles 15, these rabbles being so disposed that material fed onto any one of the rotating hearths will be moved outwardly thereon by the rabbles 14 and discharged over the edge of the hearth, while material deposited upon the outer portion of any section of the fixed hearths will be moved inwardly over the same and discharged through the central opening therein onto the rotating hearth below. Material deposited upon the top hearth or roof of the furnace is fed through a suitably luted opening therein onto the uppermost rotating hearths, passes therefrom onto the fixed hearth below, from the latter onto the rotating hearths below, and so on throughout the furnace, being finally discharged from the bottom hearth 2, which in this case is, like the top hearth 2, without a heating chamber therein, although not necessarily thus constructed.

The top flue 10, into which the flues 8 discharge, conveys the products of combustion to one or other of a pair of regenerators 16 disposed one at each end of the furnace, the flow being regulated by valves 17 so as to cut it off from the regenerator at one end of the furnace when it is being fed to the regenerator at the opposite end of the furnace. The products of combustion descend in each regenerator to an off-take flue 18 at the base of the same.

Air is introduced into the bottom of each regenerator through a pipe 19 and escapes from the top of each regenerator into a flue 20, which communicates with the uppermost treating chamber of the furnace, as shown in Fig. 1, the lowermost treating chamber having one or more discharge flues 22 through which the heated air and gases, after descending through the various treating chambers of the furnace, can escape either into the atmosphere or into any suitable apparatus in which they are utilized. The flue 20 is provided with valves 23 whereby it may be placed in communication with either of the regenerators 16 at will, the air being passed upwardly through the heated contents of one regenerator while the products of combustion are being passed downwardly through the contents of the other regenerator, so that a continuous supply of heated air is available.

The hearths 2 can be readily removed from the furnace by means of a crane or derrick above the same, the supporting feet 3 for the uppermost hearth being withdrawn after the removal of said hearth so as not to interfere with the removal of the second hearth, and so on throughout the series. The hearths 12 can be detached from the shaft 11 and removed vertically alternately with the hearths 2, or (the rabbles 14 and 15 being first removed) the shaft 11 may be raised bodily until each hearth 12 contacts with the hearth 2 above it and the entire series of hearths may then be lifted from the furnace, the feet 3 being withdrawn laterally so as not to interfere with such removal of the hearths.

The making of the hearths in sections and the provision of a plurality of shafts, one for each section of the hearth, serves to lessen the weight upon any one of the shafts in effecting the removal of the hearths in accordance with the method last described. If the hearths 2 are not thus divided into sections lifting movement may be imparted to the three shafts simultaneously by any suitable form of hoisting mechanism.

Although, in practice the outer casing and each of the rotating shafts will carry a series of superposed hearths my invention might be embodied in a furnace in which the outer casing and each of the rotating shafts had but a single hearth.

I claim:

1. A furnace consisting of a casing having a stationary hearth therein with a plurality of openings therethrough, and a plurality of rotating shafts extending through said openings, and carrying hearths which alternate with and lap the fixed hearths.

2. A furnace consisting of a casing having a series of superposed stationary hearths therein, each with a plurality of openings therethrough, and a plurality of rotating shafts extending through said openings and each carrying a series of superposed hearths which alternate with and lap the stationary hearths.

3. A furnace consisting of a casing having a stationary hearth therein with a plurality of openings therethrough, and a plurality of rotating shafts extending through said openings, and carrying hearths which alternate with and lap the stationary hearth, said stationary hearth having a passage therethrough, and the casing of the furnace having inlet and outlet flues communicating with said passage.

4. A furnace consisting of a casing having a series of superposed stationary hearths therein, each with a plurality of openings therethrough and a plurality of rotating shafts extending through said openings and each carrying a series of superposed hearths which alternate with and lap the stationary hearths, each of said stationary hearths having a passage therethrough and the casing of the furnace having inlet and outlet flues communicating with said passages.

5. A furnace consisting of a casing having a series of superposed stationary hearths therein, each with a plurality of openings therethrough, and a plurality of rotating shafts extending through said openings, and each carrying a series of superposed hearths alternating with and lapping the stationary hearths, both stationary and rotating hearths having depending rabbles for acting upon the material on a hearth below.

6. A furnace consisting of a casing having a series of superposed hearths therein, and inwardly projecting feet upon which said hearths are supported so as to be vertically removable.

7. A furnace consisting of a casing having a series of superposed hearths therein, and inwardly projecting but laterally removable feet upon which said hearths are mounted so as to be vertically removable.

8. A furnace consisting of a casing having therein a stationary hearth composed of separable sections disposed end to end, and means for movably mounting each of said sections in the casing independently of the others.

9. A furnace having a casing with a series of superposed stationary hearths therein, each composed of a series of sections disposed end to end, the casing having inwardly projecting feet for each section whereby said sections are vertically removable.

10. A furnace having a casing with a series of superposed stationary hearths therein, each composed of a series of sections disposed end to end, the casing having inwardly projecting and laterally removable feet for each section.

11. A furnace having a casing and a series of rotating vertical shafts therein, hearths carried respectively by said casing and by said shafts, the casing hearth having a plurality of openings therein, one for each of the rotating vertical shafts, and the fixed and rotating hearths lapping one another, said casing having hearth supports from which the hearth is vertically removable.

12. A furnace having a casing and a series of superposed hearths therein, each having a plurality of openings in it, a rotating vertical shaft passing through each of said openings, a series of superposed hearths carried by each of said shafts and alternating with and lapping the hearths of the casing, said casing having supports for each of its hearths from which supports said hearths are vertically removable.

13. A furnace having a casing with a series of superposed hearths, each composed of a series of sections disposed end to end and each of said sections having an opening therein, rotating vertical shafts passing through said openings and each having a series of superposed hearths mounted upon it, which hearths alternate with and overlap those of the casing, said casing having supports for each section of each hearth from which supports said sections are vertically removable.

In testimony whereof, I have signed my name to this specification, in the presence of two subscribing witnesses.

UTLEY WEDGE.

Witnesses:
KATE A. BEADLE,
HAMILTON D. TURNER.